US005524437A

United States Patent [19]
Larkin et al.

[11] Patent Number: 5,524,437
[45] Date of Patent: Jun. 11, 1996

[54] CONTINUOUSLY VARIABLE HYDROSTATIC TRANSMISSION HAVING RATIO CONTROLLER ACTUATING COMPONENTS INCORPORATED IN OUTPUT SHAFT

[75] Inventors: Robert F. Larkin; Lawrence R. Folsom, both of Pittsfield, Mass.

[73] Assignee: Martin Marietta Corporation, King of Prussia, Pa.

[21] Appl. No.: 380,276

[22] Filed: Jan. 30, 1995

[51] Int. Cl.⁶ .................................................. F16D 39/00
[52] U.S. Cl. ................................. 60/492.000; 91/505.000
[58] Field of Search .......................... 60/487, 490, 491, 60/492, 444; 92/12.2, 57, 71; 91/505, 507; 417/269

[56] References Cited

U.S. PATENT DOCUMENTS

| | | | |
|---|---|---|---|
| 1,648,000 | 11/1927 | Lee . | |
| 2,832,198 | 4/1958 | Pichon | 60/53 |
| 3,175,363 | 3/1965 | Molly | 60/53 |
| 3,204,411 | 9/1965 | Stockton | 60/53 |
| 3,291,068 | 12/1966 | Wiggermann | 103/162 |
| 3,313,108 | 4/1967 | Allgaier et al. | 60/492 X |
| 3,364,680 | 1/1968 | Ososnar | 60/492 X |
| 3,601,981 | 8/1971 | Ifield | 60/19 |
| 3,602,105 | 8/1971 | Slusher | 91/483 |
| 3,654,761 | 4/1972 | Eickmann | 60/53 |
| 3,740,954 | 6/1973 | Young | 60/489 |
| 3,834,164 | 9/1974 | Ritter | 60/492 |
| 4,493,189 | 1/1985 | Slater | 60/489 |
| 4,495,768 | 1/1985 | Valavaara | 60/414 |
| 4,901,529 | 2/1990 | Iino | 60/489 |
| 5,423,183 | 6/1995 | Folsom | 60/492 |

*Primary Examiner*—Hoang Nguyen
*Attorney, Agent, or Firm*—Robert A. Cahill; Geoffrey H. Krauss

[57] ABSTRACT

To control the transmission ratio of a continuously variable hydrostatic transmission including an input shaft, an output shaft, an pump unit driven by the input shaft, a grounded motor unit, and an a wedge-shaped swashplate drivingly and pivotally connected to the output shaft in hydraulic fluid-communicating position between the pump and motor units, a ratio controller is provided having a hydraulically actuated piston incorporated internally of the output shaft. A pilot valve, also incorporated internally of the output shaft, operates to create differential fluid pressures at opposite end faces of the piston, forcing axial motion of the piston and ratio-changing pivotal movement of the swashplate linked to the piston.

18 Claims, 2 Drawing Sheets

CONTINUOUSLY VARIABLE HYDROSTATIC TRANSMISSION HAVING RATIO CONTROLLER ACTUATING COMPONENTS INCORPORATED IN OUTPUT SHAFT

REFERENCE TO RELATED APPLICATIONS

The invention disclosed in this application has particular, but not necessarily limited application to the continuously variable hydrostatic transmissions disclosed in copending U.S. patent applications, Ser. Nos. 08/093,192, filed Jul. 13, 1993 and now U.S. Pat. No. 5,423,183, issued Jun. 13, 1995; 08/333,688, filed Nov. 3, 1994 (now allowed); 08/342,472, filed Nov. 21, 1994 (now allowed); and 08/380,269, filed Jan. 30, 1995 filed concurrently herewith. The disclosures of these applications are incorporated herein by reference.

FIELD OF THE INVENTION

The present invention relates to hydraulic machines and, more particularly, to hydrostatic transmissions capable of transmitting power from a prime mover to a load at continuously (infinitely) variable transmission ratios.

BACKGROUND OF THE INVENTION

In U.S. patent application Ser. No. 08/093,192, a hydraulic machine is disclosed as including a hydraulic pump unit and a hydraulic motor unit positioned in opposed, axially aligned relation with an intermediate, wedge-shaped swashplate. The pump unit is connected to an input shaft driven by a prime mover, while the motor unit is grounded to the stationary machine housing. An output shaft, coaxial with the input shaft and drivingly coupled to a load, is connected to the swashplate. When the pump unit is driven by the prime mover, hydraulic fluid is pumped back and forth between the pump and motor units through specially configured ports in the swashplate. As a result, three torque components, all acting in the same direction, are exerted on the swashplate to produce output torque on the output shaft for driving the load. Two of these torque components are a mechanical component exerted on the swashplate by the rotating pump unit and a hydromechanical component exerted on the swashplate by the motor unit. The third component is a pure hydrostatic component resulting from the differential forces created by the fluid pressures acting on circumferentially opposed end surfaces of the swashplate ports, which are of different surface areas due to the wedge shape of the swashplate.

To change transmission ratio, the angular orientation of the swashplate relative to the axis of the output shaft is varied. Since the transmission ratio, i.e., speed ratio of input shaft/output shaft, is continuously variable between 1:0 and 1:1, the prime mover can run at a constant speed set essentially at its most efficient operating point. The availability of a 1:0 (neutral) transmission ratio setting eliminates the need for a clutch. Unlike conventional, continuously variable hydrostatic transmissions, wherein hydraulic fluid flow rate increases proportionately with increasing transmission ratio such that maximum flow rate occurs at the highest transmission ratio setting, the flow rate in the hydraulic machines disclosed in the cited applications reaches a maximum at a midpoint in the ratio range and then progressively decreases to essentially zero at the highest transmission ratio setting. Thus, losses due to hydraulic fluid flow are reduced, and the annoying whine of conventional hydrostatic transmissions at high ratios is avoided. By virtue of the multiple torque components exerted on the swashplate, the decreasing hydraulic fluid flow in the upper half of the output speed range, and the capability of accommodating an optimum performance prime mover input, the hydraulic machines of the cited applications have a particularly advantageous application as a highly efficient, quiet, continuously variable hydrostatic transmission in vehicular drive trains.

SUMMARY OF THE INVENTION

An objective of the present invention is to provide an improved continuously variable hydrostatic transmission.

Another objective of the present invention is to provide improvements in the provisions for controlling transmission ratio in continuously variable hydrostatic transmissions.

A further objective of the present invention is to provide an improved ratio controller for continuously variable hydrostatic transmissions of the type disclosed in the cited U.S. patent applications.

Yet another objective is to provide an improved ratio controller for continuously variable hydrostatic transmissions that affords packaging advantages contributing to reductions in transmission size.

A still further objective of the present invention is to provide an improved ratio controller for a continuously variable hydrostatic transmission that is efficient in design, economical to manufacture using fewer parts, and reliable in operation.

To achieve these objectives, the continuously variable hydrostatic transmission of the present invention comprises a housing; an input shaft journalled in the housing; an output shaft journalled in the housing; a hydraulic pump unit; a hydraulic motor unit; a swashplate positioned between the hydraulic pump and motor units and having ports to accommodate a pumped flow of hydraulic fluid between the hydraulic pump and motor units, the swashplate being mounted for movement to an infinite number of positions respectively setting an infinite number of different transmission ratios.

The transmission further comprises a ratio controller including a piston slidingly received in a compartment internally formed in one of the input and output shafts to define a pair of chambers; fluid valving selectively operable to create differential hydraulic fluid pressures in the chambers and thereby produce linear movement of the piston; and a linkage translating linear movement of the piston into transmission ratio-changing repositioning of the swashplate.

Additional features, advantages, and objectives of the invention will be set forth in the description which follows and in part will be apparent from the description, or may be learned by practice of the invention. The objectives and advantages of the present invention will be realized and attained by the apparatus particularly pointed out in the following written description and the appended claims, as well as in the accompanying drawings.

It will be understood that both the foregoing general description and the following detailed description are exemplary and explanatory and are intended to provide further explanation of the invention as claimed.

The accompanying drawings are intended to provide a further understanding of the invention and are incorporated in and constitute a part of the specification, illustrate a preferred embodiment of the invention and, together with the description, serve to explain the principles of the invention.

BRIEF DESCRIPTION OF THE DRAWINGS

Like reference numerals refer to corresponding parts throughout the several views of the drawings.

DETAILED DESCRIPTION OF THE PREFERRED EMBODIMENT

Figure 1:
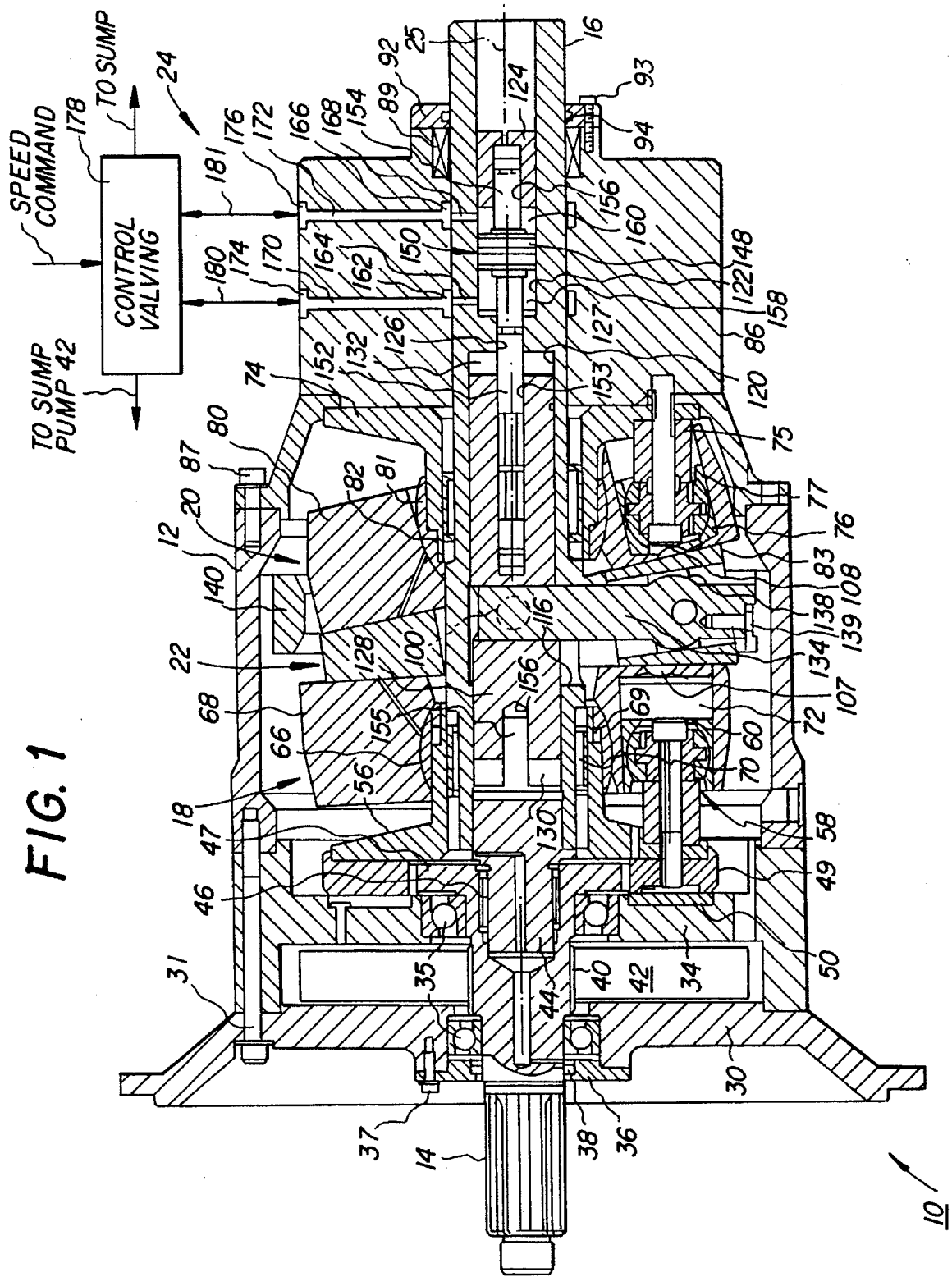
FIG. 1 is a longitudinal sectional view of a continuously variable hydrostatic transmission in accordance with the present invention.

The continuously variable hydrostatic transmission according to the preferred embodiment of the present invention, generally indicated at 10 in FIG. 1, comprises, as basic components, a housing 12 in which are journaled an input shaft 14 and an output shaft 16 in coaxial, generally end-to-end relation. The end of input shaft 14 external to the housing is suitably adapted for driving connection to a prime mover (not shown), while the end of output shaft 16 external to the housing is suitably adapted for driving connection to a load (not shown). Input shaft 14 drives a hydraulic pump unit, generally indicated at 18. A hydraulic motor unit, generally indicated at 20, is grounded to housing 12 in axially opposed relation to pump unit 18. A wedge-shaped swashplate, generally indicated at 22, is drivingly connected to the output shaft 16 in a position between the pump and motor units and is ported to provide for the exchange of hydraulic fluid between the pump and motor units. A controller, generally indicated at 24, is linked to the swashplate 22 for the purpose of pivotally adjusting the angle of swashplate orientation relative to the output shaft axis 25, thereby setting the transmission ratio of input shaft speed to output shaft speed.

Now referring to FIG. 1 in greater detail, the cylindrical housing 12 includes an end cover 30 secured in place by an annular array of bolts, one seen at 31, to close off the open input end of the housing. Input shaft 14 extends into housing 12 through a central opening in the cover and a central opening in a housing partition 34. Bearings 35, fitted in the cover opening and the partition opening journal the input shaft 14 for rotation. An annular end cap 36, affixed to cover 30 by bolts 37, holds a seal 38 against the input shaft peripheral surface to prevent leakage of hydraulic fluid.

The axial section of the input shaft between cover 30 and housing partition 34 is splined, as indicated at 40, to facilitate driving connection with a sump pump, diagrammatically indicated at 42 in FIG. 1. Inlet and outlet housing ports (not shown) provide for fluid connection of sump pump 42 into a hydraulic circuit, such as disclosed in the cited U.S. patent application Ser. No. 08/333,688, to pump makeup hydraulic fluid from a sump (not shown) to the hydraulic pump and motor units.

Still referring to FIG. 1, the inner end of input shaft 14 is counterbored to provide a cylindrical recess for receiving a reduced diameter, inner end termination 44 of output shaft 16. Bearings 46, fitted in this input shaft recess, provide inner end journal support for the output shaft. The inner terminal portion of input shaft 14 beyond housing partition 34 is flared to provide a radial flange 47 having a splined peripheral surface in meshed engagement with a splined central bore of an annular thrust washer 49. An annular wear plate 50, keyed in an annular recess in the inner face of housing partition 34, cooperates with thrust washer 49 to provide a hydrostatic thrust bearing in a manner described in cited U.S. patent application Ser. No. 08/333,688 to effectively handle the axial thrust loadings developed in transmission 10.

The inner radial end face of thrust washer 49 is recessed to receive the radially flared left end portion of a carrier 56 for a plurality of pistons included in hydraulic pump unit 18. These pistons, for example, ten in number with one being generally indicated at 58, are uniformly distributed in a circular array concentric with output shaft axis 25 in the manner disclosed in the cited applications. Each piston 58 may be constructed in the manner detailed in cited U.S. patent application Ser. No. 08/342,472.

The cylindrical right end portion of pump piston carrier 56 slidingly mounts an annular spherical bearing 66 conforming to a spherical surface machined in the central opening of an annular pump cylinder block 68. Compression springs 69 acting against axially opposed shoulders provided on carrier 56 and spherical bearing 66 urge the spherical bearing rightward toward the output end of transmission 10. A bearing 70 is confined in the central opening of pump piston carrier 56, through which output shaft 16 extends, to provide journal support for pump piston carrier 56. Cylinder block 68 includes an annular array of pump cylinders 72 for respectively receiving the pump pistons 58. By virtue of the spherical bearing mountings of pump piston heads 60 and pump cylinder block 68, precessing motion of the pump cylinder block is accommodated.

Still referring to FIG. 1, hydraulic motor unit 20 is essentially structurally equivalent to hydraulic pump unit 18. However, an annular motor piston carrier 74, equivalent to rotating pump piston carrier 56, is instead grounded to housing 12 by an annular array of bolts 75. These bolts also serve to mount motor pistons, generally indicated at 76, which may be of the same construction as pump pistons 58. A motor cylinder block 80 is then swivel mounted on carrier 74 via an annular spherical bearing 81. Compression springs 82 urge spherical bearing 81 leftward toward the input end of transmission 10. Again, as in the case of pump cylinder block 68, a circular array of motor cylinders 83 are formed in cylinder block 80 to respectively receive motor pistons 76. Since motor unit 20 is grounded to housing 12 by bolts 75, the motor pistons 76 and cylinder block 80 do not rotate, however, the spherical bearing mountings of motor piston heads 77 to bolts 75 and motor cylinder block 80 to carrier 74 accommodate nutating (precessing) motion of the motor cylinder block.

As further seen in FIG. 1, output shaft 16 extends rightwardly through the central opening in carrier 74 and exits housing 12 through a central opening in a housing output end closure 86 affixed to housing 12 by bolts, one seen at 87. A ring bearing 89, recessed in the end closure central opening provides journal support for the output shaft just prior to exiting housing 12. An annular end cap 92, affixed to end closure 86 by bolts 93, confines a seal 94 against the surface of output shaft 16 at the point of final exit from the housing to prevent leakage of hydraulic fluid.

Swashplate 22 is drivingly connected to output shaft 16 by a pivotal coupling, indicated in phantom line at 100 in FIG. 1, in operative position between pump unit 18 and motor unit 20. Reference may be had to the cited U.S. patent applications for details of suitable swashplate-output shaft pivotal drive couplings. As also described in these patent applications, the opposed faces of the pump and motor cylinder blocks are pressed into input and output faces, respectively, of swashplate 22 by the spherical bearing springs 69 and 82. The input and output faces of the swashplate 22 are relatively oriented at an acute angle to provide the wedge shape of the swashplate. Ports 106, seen in FIG. 3, extend between the input and output faces of the swashplate and communicate with openings 107 into the pump cylinders 72 and openings 108 into the motor cylinders 83 (FIG. 1), such that hydraulic fluid is pumped back and forth between the pump and motor units to generate output torque on the swashplate.

As seen in FIG. 1, a large diameter axial bore is drilled into the input end of output shaft 16 to create a compartment 120, which is plugged by output shaft termination 44. A smaller diameter axial bore is drilled into the output end of the output shaft to create a compartment 122 which is sealed by a plug 124. A coaxial hole 126 is drilled in the partition 127 separating the inner ends of compartments 120 and 122. An actuating piston 128 is slidingly received in compartment 120. The axial length of the actuating piston is suitably less than the axial length of compartment 120, such as to define a chamber 130 between the left piston end face and output shaft termination 44 and a chamber 132 between the right piston end face and compartment partition 127.

An actuating arm 134 is joined to the actuating piston at its inner end and extends radially outward through an axially elongated slot 136 in output shaft 16. The outer end of the actuating arm is pivotally connected to swashplate 22 by spherical bearings indicated at 138. The termination of actuating arm 134 also serves to mount, via bolt 139, a balance ring 140 designed to counterbalance the eccentric masses of the swashplate 22 and the precessed pump 68 and motor 80 cylinder blocks.

From the foregoing description, it is seen that the actuating piston 128 and actuating arm 134 rotate in unison with output shaft 16 and swashplate 22. Moreover, it is appreciated that axial motion of actuating piston 128 produces, via actuating arm 134, pivotal motion of swashplate 22 about its pivotal coupling 100 to output shaft 16, thereby changing the angular orientation of the swashplate relative to output shaft axis 25. As noted above and as described in the cited U.S. patent applications, swashplate angle determines transmission ratio, i.e., ratio of speed of input shaft 14 to speed of output shaft 16. Thus, as will be seen from the description to follow, actuating piston 128 and actuating arm 134 constitute actuating components of ratio controller 24.

Still referring to FIG. 1, output shaft compartment 122 is utilized to slidingly receive the valve piston 148 of a spool valve, generally indicated at 150. This spool valve also includes a valve stem 152 that extends from valve piston 148 through hole 126 in intercompartment partition 127 into an elongated, blind bore 154 in actuating piston 128. A short auxiliary valve stem 154 extends from valve piston 148 in the opposite direction from valve stem 152 and terminates in a blind bore 156 in plug 124 as an expedient to equalize the surface areas of the opposed radial end faces of valve piston 148. A rod 155, axially extending from output shaft termination 44, is slidingly received in a blind bore 156 drilled into the left end of actuating piston 128. Rod 155 is of the same diameter as valve stem 154 so as to equalize the surface areas of the opposed radial end faces of actuating piston 128.

The left radial end face of valve piston 148 and shaft partition define an annular valve chamber 158, while the right radial face of the valve piston and plug 124 define an annular valve chamber 160. Valve chamber 158 communicates with an annular cavity 162 formed in the central opening of end closure 86 via a radial hole 164 in output shaft 16, while valve chamber 160 communicates with an annular cavity 166 formed in the end closure central opening via a radial hole 168 in the output shaft. Fluid passages 170 and 172 in end closure 86 provide respective fluid communication between annular cavities 162 and 166 and ports 174 and 176, which are respectively connected to a control valving 178 by fluid lines 180 and 181. Control valving 178 selective operates in response to inputted ratio (speed) commands to equalize hydraulic fluid pressures in valve chambers 158 and 160 and thus set a desired transmission ratio and to create differential hydraulic fluid pressures in the valve chambers, resulting in axial movement of valve piston 148. As will be seen, axial movement of valve piston 148 produces axial movement of actuating piston 128 and consequent pivotal motion of swashplate 22. Control valving 178 may be of the configuration illustrated in cited U.S. patent application Ser. No. 08/380,269.

Figure 2:
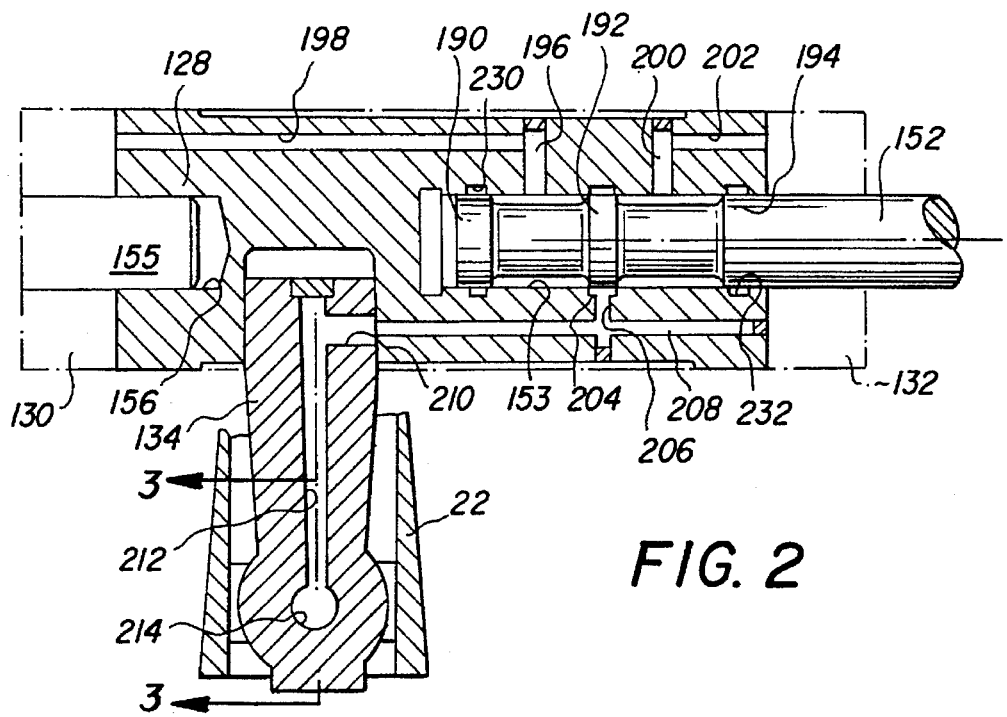
FIG. 2 is an enlarged, fragmentary sectional view of actuating components of a ratio controller for the continuously variable hydrostatic transmission of FIG. 1.

Turning to FIG. 2, the portion of valve stem 152 slidingly received in bore 153 of actuating piston 128 is machined to provide a set of three axially spaced valve lands 190, 192, and 194. The axial portion of bore 153 between valve lands 190 and 192 is in fluid communication with actuating chamber 130 via blind radial passage 196 and axial passage 198, while the axial portion of bore 153 between valve lands 192 and 194 is in fluid communication with actuating chamber 132 through blind radial passage 200 and axial passage 202.

Figure 3:
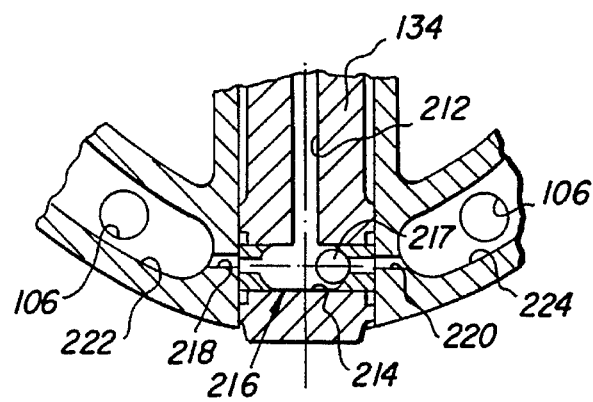
FIG. 3 is a sectional view taken along line 3—3 of FIG. 2.

Center valve land 192 controls fluid communication between actuating chamber 130 and 132 and an annular cavity 204 formed in actuating piston bore 153. Annular cavity 204, in turn, is in fluid communication with a blind radial passage 206 and an axial passage 208 formed in actuating piston 128, and a blind axial passage 210, a blind radial passage 212, and a circumferentially directed hole 214, all formed in actuating arm 134. As seen in FIG. 3, a shuttle valve, generally indicated 216, is incorporated in hole 214 to control fluid communication with opposed swashplate passages 218 and 220 respectively opening into kidney-shaped surface cavities 222 and 224. Cavity 222 communicates with one or more axial swashplate ports 106 in the high pressure side of swashplate 22, while cavity 224 communicates with a corresponding number of axial swashplate ports 106 in the low pressure side of the swashplate. Ball 217 of shuttle valve 216 ensures that only the high pressure side of the swashplate 22 communicates with annular cavity 204 via passages 212, 210, 208 and 206.

Figure 4:
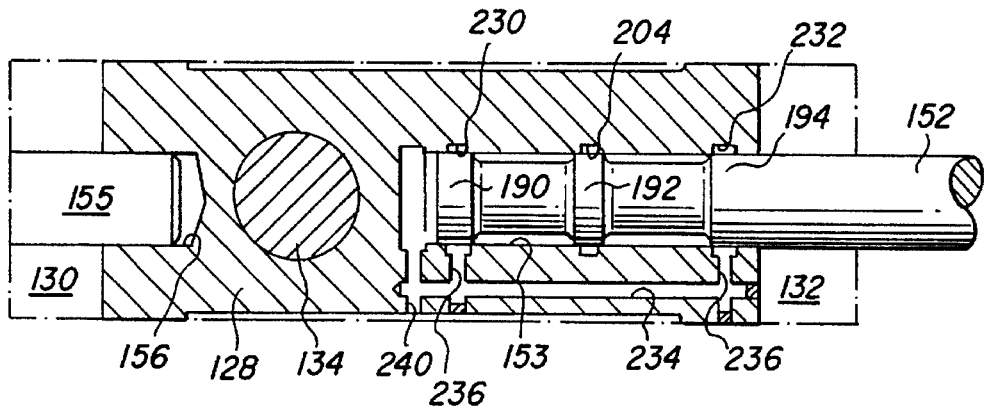
FIG. 4 is an enlarged fragmentary view of the ratio controller actuating components taken along a section angularly displaced from the sectional view of FIG. 2.

Now turning to FIG. 4, valve land 190, carried by valve stem 152, controls fluid communication with an annular cavity 230 in actuator piston bore 153, and valve land 194 controls fluid communication with an annular cavity 232 in the actuator piston bore 153. Annular cavities 230 and 232 are connected to a blind axial vent passage 234 in actuating piston 128 by separate radial passages 236. The open end of vent passage 234 communicates with a radial passage 240 in actuating piston 128 that is open to atmospheric pressure in the interior of housing 12.

Considering FIGS. 2 and 4 together, when valve stem 152 of spool valve 50 (FIG. 1) moves rightward, valve land 192 unblocks annular cavity 204, and high pressure hydraulic fluid in passage 208, communicating with the high pressure side of swashplate 22 as described above, can flow into actuator chamber 130 through passages 196 and 198. Concurrently with rightward movement of spool valve stem 152, valve land 194 unblocks annular cavity 232, and thus actuator chamber 132 is vented to atmospheric pressure via passages 202, 200, 236, 234 and 240 in actuating piston 128. Thus, hydraulic fluid flows into actuator chamber 130, as hydraulic fluid flow out of actuator chamber 132. The resulting fluid pressure unbalance forces actuating piston 128 to the right as the volume of actuating chamber 130 expands and the volume of actuating chamber 132 contracts. As seen in FIG. 1, rightward movement of actuating piston 128 causes swashplate 22 to be pivoted in the counterclockwise direction. When rightward movement of spool valve stem 152 stops, catch-up rightward movement of actuating piston 128 stops when valve land 192 seals annular cavity 204 from actuating chamber 130 and valve land 192 concurrently seals vented annular cavity 232 from actuating chamber 132. The fluid pressures in actuating chambers 130 and 132 then equalize to fix the axial position of actuating piston 128 and the transmission ratio-setting angle of swashplate 22.

When spool valve stem 152 is moved leftward by operation of control valving 178 (FIG. 1), it is seen that valve land 192 unblocks annular cavity 204 to connect actuating chamber 132 to high pressure fluid passage 208 via fluid passages 200 and 204. At the same time, valve land 190 unblocks annular cavity 230, and actuator chamber 130 is then vented to the atmospheric pressure in vent passage 236 via fluid passages 198, 196, and 206. Hydraulic fluid flows into actuator chamber 132, as hydraulic fluid flows out of actuator chamber 130. The resulting pressure imbalance forces actuating piston 128 leftward and swashplate 22 to pivot in the clockwise direction. Again, when leftward movement of spool valve stem 152 is stopped by control valving 178, catchup leftward movement of actuating piston 128 stops when valve lands 190 and 192 concurrent valve off annular cavities 230 and 204, respectively. The fluid pressures in actuator chambers 130 and 132 equalize to set the axial position of actuating piston 128 and the new transmission ratio-setting angle of swashplate 22.

Returning to FIG. 1, control valving 178 sets an axial position of valve stem 152, that in turn sets an axial position of actuating piston 128 and an angular, transmission ratio-setting position of swashplate 22, by maintaining equal hydraulic fluid pressures in valve chambers 158 and 160 to fix the axial position of valve piston 148. Control valving 178 does so by connecting both valve chambers to a common source of pressurized hydraulic fluid, such sump pump 42 that supplies makeup hydraulic fluid at control pressure to the hydraulic pump and motor units.

To produce rightward movement of valve stem 152, resulting in the rightward movement of actuating piston 128 and the counterclockwise pivotal motion of swashplate 22 described above, control valving 178 vents valve chamber 160 by, for example, connecting the valve chamber to the transmission sump. Hydraulic fluid flows out of valve chamber 160, as hydraulic fluid flows into valve chamber 158, which is maintained in connection with the sump pump output by control valving 178. Valve piston is thus shifted rightward, drawing valve piston 152 to the right.

Leftward movement of the valve stem 152, resulting in the leftward movement of actuating piston 128 and the clockwise pivotal motion of swashplate 22 described above, is produced by the action of control valving 178 in venting valve chamber 158, while valve chamber 160 remains connected to the sump pump output. Hydraulic fluid flows out of valve chamber 160, as hydraulic fluid flows into valve chamber 158, and valve piston 148 is forced rightward.

Once the new swashplate angle commanded by the speed command input is achieved, control valving 178 reconnects the vented valve chamber to the sump pump output to equalize the fluid pressures in valve chambers 158 and 160, thereby setting the new swashplate angle to the commanded transmission ratio setting.

From the foregoing description, it is seen that the present invention provides a continuously variable hydrostatic transmission of compact construction largely due to the packaging of ratio controller components within a shaft of the transmission. While, in the illustrated embodiment, these components are incorporated in the transmission output shaft, it will be appreciated that the transmission could be reconfigured to incorporate these components in the transmission input shaft. A further significant advantage of the present invention resides in the feature that low pressure hydraulic fluid may be utilized as a control pressure to operate spool valve 150, while high pressure hydraulic fluid is utilized to provide the requisite forces to angularly position swashplate 22 via actuating piston 128. Thus, spool valve 150, acts as a pilot valve operated by low pressure hydraulic fluid, such as is available at the sump pump output, to control the action of high pressure hydraulic fluid to generate high ratio-changing forces on the swashplate. An added benefit results from the fact that, since only low pressure hydraulic fluid is handled in the control portion of the ratio controller hydraulic circuit, i.e., spool valve 150 and control valving 178, design economies in requisite fluid seals, valving, and fluid lines are realized.

It will be apparent to those skilled in the art that various modification and variations can be made to the apparatus of the present invention without departing from the spirit of the invention. Thus, it is intended that the present invention be construed to cover modifications and variations thereof, provided they come within the spirit and scope of the appended claims and their equivalents.

What is claimed is:

1. A continuously variable hydrostatic transmission comprising, in combination:

a housing;

an input shaft journalled in the housing;

an output shaft journalled in the housing;

a hydraulic pump unit;

a hydraulic motor unit;

a swashplate positioned between the hydraulic pump and motor units and having ports to accommodate a pumped flow of hydraulic fluid between the hydraulic pump and motor units, the swashplate mounted for movement to an infinite number of positions respectively setting an infinite number of different transmission ratios; and a ratio controller including:

an actuating piston slidingly received in an actuating compartment internally formed in one of the input and output shafts to define first and second actuating chambers, fluid valving selectively operable to create differential hydraulic fluid pressures in the first and second actuating chambers and thereby produce linear movement of the actuating piston, and a linkage translating linear movement of the actuating piston into transmission ratio-changing repositioning of the swashplate.

2. The transmission defined in claim 1, wherein the fluid valving includes a valve incorporated in a valve compartment internally formed in the one of the input and output shafts, the valve operating to create the differential hydraulic fluid pressures in the first and second actuating chambers.

3. The transmission defined in claims 2, wherein the valve is a pilot valve actuated from a source of low pressure hydraulic fluid to selectively vent one of the first and second actuating chambers and concurrently connect the other of the first and second actuating chambers to a source of high pressure hydraulic fluid to create the differential hydraulic fluid pressures in the first and second actuating chambers.

4. The transmissions defined in claim 3, wherein the source of high pressure hydraulic fluid is a high pressure side of the swashplate.

5. The transmission defined in claim 4, wherein the pilot valve includes valve elements received in a bore formed in the actuating piston, and the actuating piston includes internal high pressure and vent passages having open ends in fluid communication with the bore, the valve elements selectively slidably positioned in the bore in fluid blocking relation with the passage open ends to create the fluid pressure differentials in the first and second actuating chambers and to equalize the fluid pressures in the first and second actuating chambers.

6. The transmission defined in claim 5, wherein the pilot valve further includes a valve piston slidingly received in the valve compartment to define first and second valve chambers, and a valve stem connected to the valve piston and extending from the valve compartment into the actuating piston bore, the valve elements being carried by the valve stem.

7. The transmission defined in claim 6, wherein the fluid valving further includes a control valve in fluid connection with the pilot valve to create differential fluid pressures in the first and second valve chambers, whereby to produce movement of the valve piston and selective positioning of the valve elements.

8. A continuously variable hydrostatic transmission comprising, in combination:
   a housing;
   an input shaft journalled in the housing;
   a hydraulic pump unit drivingly coupled to the input shaft;
   a hydraulic motor unit grounded to the housing;
   an output shaft journalled in the housing;
   a wedge-shaped swashplate positioned between the hydraulic pump and motor units and including ports accommodated pumped flow of hydraulic fluid between the hydraulic pump and motor units, the swashplate connected to the output shaft in torque-coupled relation and pivotal to an infinite number of angular positions relative to the axis of the output shaft to respectively set an indefinite number of transmission ratios; and
   a ratio controller including:
      an actuating piston slidingly received in an actuating compartment internally formed in the output shaft to define first and second actuating chambers,
      fluid valving selectively operable to create differential hydraulic fluid pressures in the first and second actuating chambers and thereby produce axial movement of the actuating piston along the output shaft axis, and
      a linkage translating axial movement of the actuating piston into ratio-changing angular repositioning of the swashplate.

9. The transmission defined in claim 8, wherein the linkage includes an actuating arm connected to the actuating piston and extending from the actuating compartment through a slot in the output shaft to a terminal portion pivotally connect to the swashplate.

10. The transmission defined in claim 9, wherein the valving includes a valve incorporated in a valve compartment internally formed in the output shaft, the valve operating to create the differential hydraulic fluid pressures in the first and second actuating chambers.

11. The transmission defined in claims 10, wherein the valve is a pilot valve actuated from a source of low pressure hydraulic fluid to selectively vent one of the first and second actuating chambers and concurrently connect the other of the first and second actuating chambers to a source of high pressure hydraulic fluid to create the differential hydraulic fluid pressures in the first and second actuating chambers.

12. The transmission defined in claim 11, wherein the source of high pressure hydraulic fluid is a high pressure side of the swashplate.

13. The transmission defined in claim 12, wherein the actuating arm includes an internal passage providing fluid communication between the high pressure side of the swashplate and the first and second actuating chambers.

14. The transmission defined in claim 12, wherein the pilot valve includes valve elements received in a bore formed in the actuating piston, and the actuating piston includes internal high pressure and vent passages having open ends in fluid communication with the bore, the valve elements selectively slidably positioned in the bore in fluid blocking relation with the passage open ends to create the fluid pressure differentials in the first and second actuating chambers and to equalize the fluid pressures in the first and second actuating chambers.

15. The transmission defined in claim 14, wherein the actuating arm includes an internal passage providing fluid communication between the high pressure side of a the swashplate and the high pressure internal passages of the actuating piston.

16. The transmission defined in claim 14, wherein the pilot valve further includes a valve piston slidingly received in the valve compartment to define first and second valve chambers, and a valve stem connected to the valve piston and extending from the valve compartment into the actuating piston bore, the valve elements being carried by the stem.

17. The transmission defined in claim 16, wherein the fluid valving further includes a control valve in fluid connection with the pilot valve to create differential fluid pressures in the first and second valve chambers, whereby to produce movement of the valve piston and selective positioning of the valve elements.

18. The transmission defined in claim 17, wherein the actuating arm includes an internal passage providing fluid communication between the high pressure side of a the swashplate and the high pressure internal passages of the actuating piston.

* * * * *